United States Patent
Sonawane et al.

(10) Patent No.: US 10,769,236 B2
(45) Date of Patent: Sep. 8, 2020

(54) BATTERY MODELS, SYSTEMS, AND METHODS USING ROBUST FAIL-SAFE ITERATION FREE APPROACH FOR SOLVING DIFFERENTIAL ALGEBRAIC EQUATIONS

(71) Applicants: University of Washington, Seattle, WA (US); Washington University, St. Louis, MO (US)

(72) Inventors: Dayaram Sonawane, Seattle, WA (US); Manan Pathak, Seattle, WA (US); Venkat Subramanian, Seattle, WA (US); Matthew Lawder, St. Louis, MO (US)

(73) Assignees: University of Washington, Seattle, WA (US); Washington University, St. Louis, MO (US)

( * ) Notice: Subject to any disclaimer, the term of this patent is extended or adjusted under 35 U.S.C. 154(b) by 309 days.

(21) Appl. No.: 15/745,984

(22) PCT Filed: Jul. 20, 2016

(86) PCT No.: PCT/US2016/043188
§ 371 (c)(1),
(2) Date: Jan. 18, 2018

(87) PCT Pub. No.: WO2017/015396
PCT Pub. Date: Jan. 26, 2017

(65) Prior Publication Data
US 2018/0210861 A1    Jul. 26, 2018

Related U.S. Application Data

(60) Provisional application No. 62/194,678, filed on Jul. 20, 2015.

(51) Int. Cl.
*H02J 7/00* (2006.01)
*G06F 17/13* (2006.01)
(Continued)

(52) U.S. Cl.
CPC .............. *G06F 17/13* (2013.01); *G06F 30/20* (2020.01); *H01M 10/44* (2013.01);
(Continued)

(58) Field of Classification Search
CPC ............................ H02J 7/0021; H02J 7/0048
(Continued)

(56) References Cited

U.S. PATENT DOCUMENTS 5,420,493 A    5/1995  Hargadon et al.
5,936,385 A *  8/1999  Patillon ................. G01R 31/367
                                                    320/136
(Continued)

FOREIGN PATENT DOCUMENTS

WO    2017015396 A1    1/2017

OTHER PUBLICATIONS

9th IFAC Symposium on Advanced Control of Chemical Processes ADCHEM 2015 Proceedings (B. Huang et al., Ed.) Jun. 7-10, 2015, pp. i-v, Retrieved Oct. 5, 2016 from Google Web at http://www.sciencedirect.com/science?_ob=ArticleListURL&_method=list&ArticleListID=-1062567390&_sort=r&_st=13&view=c&md5=39cfff9558e82e87c5822eb670c15fc8&searchtype=a. ISSN 2405-8963.
(Continued)

*Primary Examiner* — Jerry D Robbins
(74) *Attorney, Agent, or Firm* — Christensen O'Connor Johnson Kindness PLLC

(57) ABSTRACT

Battery models using robust fail-safe iteration free approach for solving Differential Algebraic Equations, and associated systems and methods are disclosed. In one embodiment, a
(Continued)

method includes generating a model of the rechargeable battery; determining one or more initial conditions for one or more algebraic variables of the model using a solver; holding differential variables of the model static by a switch function while determining the one or more initial conditions; applying the initial conditions to the model by the switch function; and determining one or more parameters for the rechargeable battery by solving the algebraic and differential equations.

24 Claims, 10 Drawing Sheets

(51) Int. Cl.
  *H01M 10/44* (2006.01)
  *G06F 30/20* (2020.01)
  *G06F 111/10* (2020.01)
(52) U.S. Cl.
  CPC ......... *H01M 10/441* (2013.01); *H02J 7/0021* (2013.01); *H02J 7/0047* (2013.01); *G06F 2111/10* (2020.01); *H01M 2220/20* (2013.01); *H02J 7/0048* (2020.01)
(58) Field of Classification Search
  USPC .......................................................... 320/137
  See application file for complete search history.

(56) References Cited

U.S. PATENT DOCUMENTS

| | | | |
|---|---|---|---|
| 6,504,885 B1 | 1/2003 | Chen | |
| 7,904,280 B2 | 3/2011 | Wood | |
| 8,483,999 B2 | 7/2013 | Shmoylova et al. | |
| 2002/0038178 A1* | 3/2002 | Talkenberg | A63B 24/0021 701/532 |
| 2011/0054816 A1* | 3/2011 | Prada | G01R 31/367 702/63 |
| 2011/0060565 A1* | 3/2011 | Sciarretta | H01M 10/4285 703/2 |
| 2011/0279079 A1* | 11/2011 | Do Valle | H02J 7/0073 320/107 |
| 2012/0101674 A1 | 5/2012 | Wang et al. | |
| 2012/0123746 A1 | 5/2012 | Postma et al. | |
| 2012/0179437 A1 | 7/2012 | Shmoylova et al. | |
| 2012/0310571 A1 | 12/2012 | Takagi | |
| 2013/0119921 A1* | 5/2013 | Choe | H02J 7/007 320/106 |
| 2014/0031986 A1 | 1/2014 | Spitz et al. | |
| 2014/0032141 A1* | 1/2014 | Subbotin | G01R 31/367 702/63 |
| 2014/0136169 A1 | 5/2014 | Subramanian et al. | |
| 2016/0336765 A1* | 11/2016 | Trimboli | H02J 7/0021 |
| 2017/0222447 A1* | 8/2017 | Ravi | H02J 7/0063 |
| 2017/0222449 A1* | 8/2017 | MirTabatabaei | H02J 7/007 |
| 2017/0315179 A1* | 11/2017 | Baba | H01M 10/48 |
| 2017/0338666 A1* | 11/2017 | Christensen | G01R 31/367 |
| 2017/0363690 A1* | 12/2017 | Kawamura | G01R 31/3648 |
| 2018/0095140 A1* | 4/2018 | Park | G01R 31/367 |

OTHER PUBLICATIONS

Suthar, et al. "Optimal Low Temperature Charging of Lithium-ion Batteries", 9th IFAC Symposium in Advanced Control of Chemical Processes ADCHEM 2015 Proceedings (B. Huang et al., Ed.) Jun. 7-10, 2015, pp. 1216-1221, Retrieved Oct. 5, 2016 from Google Web at http://www.sciencedirect.com/science?_ob=ArticleListURL&_method=list&ArticleListID=-1062568227&_sort=r&_st=13&view=c&md5=7f235924fbc07d229f3924c8d010cb7&searchtype=a. ISSN 2405-8963.

International Search Report and Written Opinion, issued in International Application No. PCT/2016/043188, International Filing Date Jul. 20, 2016, 10 pages.
Lawder, M. T., Suthar, B., Northrop, P. W. C., De, S., Hoff, C. M., Leitermann, O., Crow, M. L., Santhanagopalan, S. and Subramanian, V. R., Battery Energy Storage System (BESS) and Battery Management System (BMS) for Grid-Scale Applications, Proceedings of the IEEE 2014, 102(6): 17 pages.
Berzins, M., Dew, P. M. and Furzeland, R. M., "Developing Software for Time-Dependent Problems Using the Method of Lines and Differential-Algebraic Integrators," Applied Numerical Mathematics 5 1989; 5(5): 375-397.
Boovaragavan, V., Ramadesigan, V., Panchagnula, M. V. and Subramanian, V. R., "Continuum Representation for Simulating Discrete Events of Battery Operation," Journal of the Electrochemical Society 2010; 157(1): A98-A104.
Cash, J. R., "Efficient numerical methods for the solution of stiff initial-value problems and differential algebraic equations," The Royal Society 2003; 459(2032): 797-815.
Cellier, F. E. and Kofman, E., "Continuous System Simulation," Springer, © 2006. Dassault Systems (2015), 658 pages. "DYMOLA".
De Swart, J. J. B., Lioen, W. M. and van der Veen, W. A. (1998), "Specification of PSIDE," Amsterdam, NL, National Research Institute for Mathematics and Computer Science (CWI) (The Netherlands), pp. 1-15.
Dew, P. M. and Walsh, J. E., "A Set of Library Routines for Solving Parabolic Equations in One Space Variable," ACM Transactions on Mathematical Software 1981; 7(3): 295-314.
Garcia, J. A. G., "A Singular Perturbation Approach to Modeling Closed Kinematic Chains," Master's Thesis, Rice University, 2000, 94 pages.
Gopal, V. and Biegler, L. T., "A successive linear programming approach for initialization and reinitialization after discontinuities of differential-algebraic equations," Department of Chemical Engineering and Engineering Design Research Center, Carnegie Mellon University, Pittsburg, PA, 1996, 61 Pages.
Hairer, E. and Wanner, G., "Solving Ordinary Differential Equations II: Stiff and Differential-Algebraic Problems," Springer Series in Computational Mathematics 14, Springer-Verlag, 1996, pp. 1-614.
Hairer, E. and Wanner, G., "Stiff differential equations solved by Radau methods," Journal of Computational and Applied Mathematics 1999; 111(1-2): 93-111.
Hindmarsh, A. C., "LSODE and LSODI, two new initial value ordinary differential equation solvers," ACM SIGNUM Newsletter 1980; 15:(2) 2 pages.
Lamour, R. and Mazzia, F., "Computation of consistent initial values for properly stated index 3 DAEs," BIT 2009; 49(1): 161-175.
Lawder, M. T., Northrop, P. W. C. and Subramanian, V. R., "Model-based SEI Layer Growth and Capacity Fade Analysis for EV and PHEV Batteries and Drive Cycles," Journal of The Electrochemical Society 2014; 161(14): A2099-A2108.
Leimkuhler, B., Petzold, L. R. and Gear, C. W., "Approximation Methods for the Consistent Initialization of Differential-Algebraic Equations," SIAM Journal on Numerical Analysis 1991; 28(1): 205-226.
Li, P. F., Li, Y. Y. and Seem, J. E., "Consistent initialization of system of differential-algebraic equations for dynamic simulation of centrifugal chillers," International Compressor Engineering Conference at Purdue, Jul. 12-15, 2010, 8 pages.
Li, S. T. and Petzold, L., "Software and algorithms for sensitivity analysis of large-scale differential algebraic systems," Journal of Computational and Applied Mathematics 2000; 125(1-2): 131-145.
"Maple dsolve," Maplesoft, 2014, <http://www.maplesoft.com/support/help/maple/view.aspx?path=dsolve> [retrieved Nov. 2014], 5 pages.
"Maple," Maplesoft, 2015, <http://www.maplesoft.com/products/maple/> [retrieved Jan. 2015], 7 pages.
"Matlab ODE15s," Mathworks, 2014, <http://www.mathworks.com/help/matlab/ref/ode15s.html> [retrieved Nov. 2014], 21 pages.
Methekar, R. N., Ramadesigan, V., Pirkle, J. C. and Subramanian, V. R., "A perturbation approach for consistent initialization of

(56) References Cited

OTHER PUBLICATIONS index-1 explicit differential-algebraic equations arising from battery model simulations," Computers & Chemical Engineering 2011; 35(11): 2227-2234.

Michelsen, M. L., "Application of Semi-Implicit Runge-Kutta Methods for Integration of Ordinary and Partial-Differential Equations," Chemical Engineering Journal 1977; 14(2): 107-112.

Northrop, P. W. C., Ramadesigan, V., De, S. and Subramanian, V. R., "Coordinate Transformation, Orthogonal Collocation, Model Reformulation and Simulation of Electrochemical-Thermal Behavior of Lithium-Ion Battery Stacks," Journal of The Electrochemical Society 2011; 158(12): A1461-A1477.

Northrop, P. W. C., Suthar, B., Ramadesigan, V., Santhanagopalan, S., Braatz, R. D. and Subramanian, V. R., "Efficient Simulation and reformulation of Lithium-Ion Battery Models for enabling electric transportation," Journal of The Electrochemical Society 2014; 161(8): E3149-E3157.

Pantelides, C. C., Gritsis, D., Morison, K. R. and Sargent, R. W. H.,"The Mathematical-Modeling of Transient Systems Using Differential Algebraic Equations," Computers & Chemical Engineering 1988; 12(5): 449-454.

Petzold, L., "Differential-Algebraic Equations Are Not ODE's," SIAM Journal on Scientific and Statistical Computing 1982; 3(3): 367-384.

Petzold, L. R., "A Description of DASSL: A Differential/Algebraic System Solver," Sandia National Labratories, Livermore, Calif., Sep. 1982, 4 pages.

Pinson, M. B. and Bazant, M. Z., "Theory of SEI Formation in Rechargeable Batteries: Capacity Fade, Accelerated Aging and Lifetime Prediction," Journal of the Electrochemical Society 2013; 160(2): A243-A250.

Praprost, K. L. and Loparo, K. A., "A stability theory for constrained dynamic systems with applications to electric power systems," IEEE Transactions on Automatic Control 1996; 41(11): 1605-1617.

Process Systems Enterprise, "gPROMS," <https://www.psenterprise.com/products/gproms>, 6 pages, 2019.

Ramadesigan, V., Northrop, P. W. C., De, S., Santhanagopalan, S., Braatz, R. D. and Subramanian, V. R., "Modeling and Simulation of Lithium-Ion Batteries from a Systems Engineering Perspective," Journal of The Electrochemical Society 2012; 159(3): R31-R45.

Reißig, G., Boche, H. and Barton, P. I., "On inconsistent initial conditions for linear time-invariant differential-algebraic equations," IEEE Transactions on Circuits and Systems I-Fundamental Theory and Applications 2002; 49(11): 1646-1648.

Santhanagopalan, S., Guo, Q., Ramadass, P. and White, R. E., "Review of models for predicting the cycling performance of lithium ion batteries," Journal of Power Sources 2006; 156(2): 620-628.

Shampine, L. F., Reichelt, M. W. and Kierzenka, J. A.,"Solving index-I DAEs in MATLAB and Simulink," Siam Review 1999; 41(3): 15 pages.

Susuki, Y., Hikiliara, T. and Chiang, H. D., "Discontinuous dynamics of electric power system with DC transmission: A study on DAE system," IEEE Transactions of Circuits and Systems—I, 2008; 55(2): 697-707.

Taylor, R., "Engineering Computing with Maple: Solution of PDEs via the Method of Lines," CACHE News, Fall 1999; 49: 5-8.

Van Keken, P. E., Yuen, D. A. and Petzold, L. R., "DASPK: A new high order and adaptive time-integration technique with applications to mantle convection with strongly temperature- and pressure-dependent rheology," Geophys. Astrophys. Fluid Dynamics 1995; 80(1-2): 57-74.

Wolfram, "NDsolve," <http://reference.wolfram.com/language/ref/NDSolve.html>, © 2019 Wolfram, 10 pages.

Wu, B. and White, R. E., "An initialization subroutine for DAEs solvers: DAEIS," Computers & Chemical Engineering 2001; 25(2-3): 301-311.

Reis, T., "Consistent initialization and perturbation analysis for abstract differential—algebraic equations," Mathematics of Control, Signals, and Systems 2007; 19: 255-281.

Chedjou, J. C., Kyamakya, K. , Latif, M. A., Khan U. A., Moussa, I. and Tuan, D. T., "Solving Stiff Ordinary Differential Equations and Partial Differential Equations Using Analog Computing Based on Cellular Neural Networks," Proceedings of the 2nd International Workshop on Nonlinear Dynamics and Synchronization, 2009, pp. 213-220.

* cited by examiner

BATTERY MODELS, SYSTEMS, AND METHODS USING ROBUST FAIL-SAFE ITERATION FREE APPROACH FOR SOLVING DIFFERENTIAL ALGEBRAIC EQUATIONS

CROSS-REFERENCE TO RELATED APPLICATION

This application claims the benefit of U.S. Provisional Application No. 62/194,678, filed Jul. 20, 2015, the disclosure of which is hereby incorporated by reference in its entirety.

STATEMENT OF GOVERNMENT LICENSE RIGHTS

This invention was made with Government support under the Advanced Research Projects Agency—Energy (ARPA-E) award No. DE-AR0000275 awarded by the United States Department of Energy (DOE). The Government has certain rights in the invention.

FIELD OF THE INVENTION

The present invention relates generally to chargeable batteries, and more particularly relates to methods and apparatuses for improving efficiency, energy density, temperature, and/or life cycle associated with charging/discharging of the batteries.

BACKGROUND

Rechargeable batteries have become an essential part of modern electronics, for example, in smart phones, computers, cameras, cars, unmanned aerial vehicles, and other devices. For instance, lithium-ion (Li-ion) batteries are a popular choice as an energy storage medium due to their relatively large energy density. However, operating a Li-ion battery too aggressively can lead to a reduced cycle life and unpredictable thermal runaway reactions. Furthermore, charging of the Li-ion batteries may take too long time or be too inefficient for a specific purpose. These challenges reduce the usefulness of the Li-ion batteries.

In some instances, predictive physical models can be used to optimize the behavior of the rechargeable batteries. For example, based on the predictive physical models, battery charging/discharging can be selected such that, for example, the charging time is shorter, the temperature of the battery is lower, or the life of the battery is longer. With predictive physical models, often the representative system of equations includes a combination of ordinary differential equations (ODEs), partial differential equations (PDEs), and algebraic equations (AEs). The PDEs are often the governing equations of the system (e.g., a battery charging system) that vary in both space and time. When discretizing these PDEs spatially, the PDEs are reduced to a set of ODEs and AEs. This resulting combined set of ODEs and AEs is known as a set of differential algebraic equations (DAEs). In typical physical systems, the ODEs will often represent most of the governing equations, while the AEs act as constraints applied to the system to ensure that the solution accurately reflects the physical possibilities (e.g., conservation laws, boundary conditions, etc.).

For a system of DAEs, a set of consistent initial conditions (ICs) must be provided in order to solve the system with standard solvers. In some cases, even small deviations from consistent ICs will cause the DAE solver to fail. Therefore, some solvers have initialization routines that calculate consistent ICs from starting guesses. However, these routines add computational time and often require specific solvers to obtain the ICs used by the primary DAE solver.

Some conventional IC estimates use non-physical approximations such as setting differential variable gradients to zero initially. Since the true value of the ICs may be significantly different from the starting guess, this approach may create solver inefficiencies for the few cases that these solvers are able to solve. Furthermore, if the true value of the ICs is sufficiently different from the zero-gradient value, the DAE solver may fail.

Some conventional technologies calculate the ICs of differential and algebraic variables separately using an Euler backward step with a very small step size in order to obtain values very near the initial time. However, these conventional technologies also create solver inefficiencies due to the very small step size used to calculate the ICs, which requires a significant computational effort for calculating the ICs.

Other conventional technologies use successive linear programming, a Taylor series approximation, or a Laplace method to find ICs. However, these methods may also require a significant computational effort, or may produce ICs that are not sufficiently accurate for the DAE solver. Therefore, a need remains for battery charging/discharging technologies that are based on efficient predictive models.

DESCRIPTION OF THE DRAWINGS

The foregoing aspects and the attendant advantages of this invention will become more readily appreciated with reference to the following detailed description, when taken in conjunction with the accompanying drawings, wherein.

DETAILED DESCRIPTION

Figure 1:
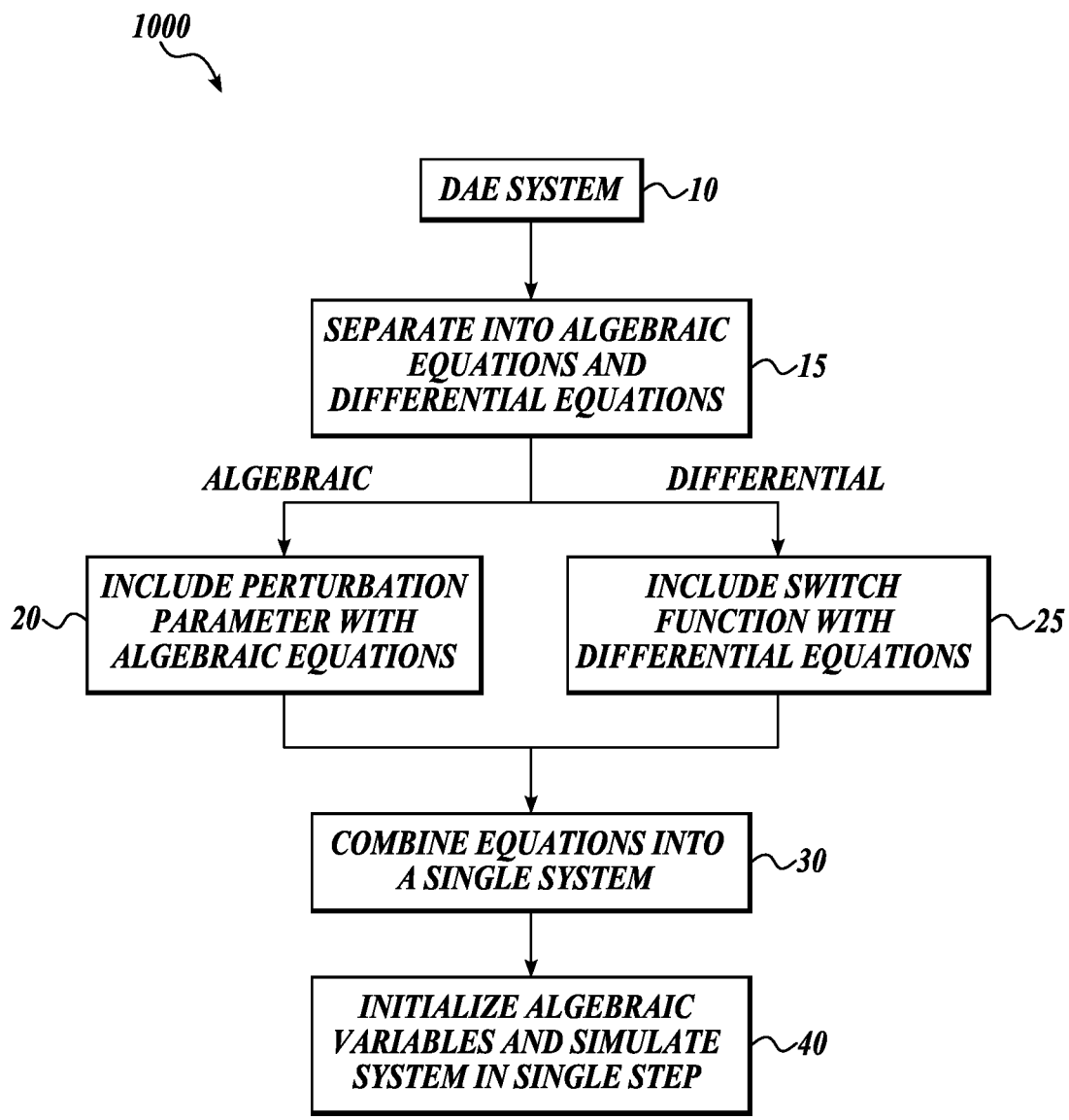
FIG. 1 is a flow chart of a single-step modeling method in accordance with an embodiment of the presently disclosed technology.

Specific details of several embodiments of battery charging and discharging are described. The inventive battery charging/discharging is based on numerical solutions of the physical equations that govern the battery charging/discharging. In some embodiments, the inventive technology uses a single-step method that includes an iteration-free system initialization to obtain consistent initial conditions (ICs), followed by solving a governing set of differential algebraic equations (DAEs) using explicit solvers. In at least some embodiments, the exact knowledge of the ICs is not needed for solving the DAEs. Since the iterations are not needed, the initialization (e.g., setting the ICs) and the DAE simulation may be performed by a single solver using a suitable switch function. Furthermore, with the single-step method, the DAE equations may be solved using an explicit (i.e., non-iterative) solver. The ICs used in the single-step method would often be too inaccurate for the conventional two-step technologies.

In some embodiments, a perturbation initialization is used to estimate the ICs for the algebraic variables, followed by solving the DAEs based on the consistent ICs obtained at the first step. In some embodiments, solving the differential (D) and algebraic (A) equations of the DAEs is combined into one solver by using a switch function (e.g., a hyperbolic tangent function). Such a switch function constrains the differential variables while the perturbation method searches for consistent ICs for the algebraic variables. The continuous nature of switch function allows for correction of inconsistent converged ICs that occurs under large perturbation values. This extension of allowable consistent converged ICs helps to expand the robustness of the single-step method. In some embodiments, using a single-step approach increases the robustness of the solution method by allowing for a larger perturbation values to relatively rapidly calculate the ICs, while enabling explicit ODE solvers to solve nonlinear DAEs directly (i.e., without iterations typically required to solve the implicit systems of equations). In at least some embodiments, the proposed approach does not require the nonlinear solvers for the initialization subroutines that find consistent ICs. Based on the solution of the governing DAE equations, different parameters for rechargeable batteries can be determined (e.g., charging/discharging current, charging/discharging voltage, temperature of the battery, peak efficiency of the battery, optimal number of charging/discharging cycles, etc.).

General DAE System

A general DAE system is shown in Equations 1.1 and 1.2 in a semi-explicit form.

$$\frac{dy}{dt} = f(t, y, z) \qquad \text{Eq. 1.1}$$

$$0 = g(t, y, z) \qquad \text{Eq. 1.2}$$

where y are the differential variables, z are the algebraic variables, and t is the time. Furthermore, function g is differentiable and dg/dt is non-singular. The system of DAEs shown above often arises from combining equations governing physical phenomena with constraints, or by discretizing a PDE's spatial variables while keeping time continuous (e.g., as shown in Examples 4 and 5 below).

In order to solve the system of DAEs shown in Equations 1.1 and 1.2, ICs for all variables are given as:

$$t=0 \ y(0)=y_0 \ z(0)=z_0 \qquad \text{Eq. 1.3}$$

However, the exact values for consistent $z_0$ are not always readily available. For conventional DAE solvers (without initialization routines), ICs must be consistent with the system of DAEs or a solution is not obtainable, because without the consistent ICs the solver fails. Variables present in the AEs (e.g., Equation 1.2) are limited to those sets that directly satisfy the algebraic limits. A system that includes ODEs only will often offer a wider range of consistent ICs, because the equations are the derivatives (e.g., they change over time) of the system variables rather than the variable values. However, combining AEs to an ODE system increases the stiffness of the system and often necessitates a priori knowledge of the exact ICs of the system.

Perturbation Method for Solving AEs

In some embodiments of the inventive technology, in order to loosen the restriction of consistency on the algebraic variables (i.e., in order to make the system of DAEs less stiff), a perturbation approach with a perturbation parameter $\varepsilon$ is used such that:

$$g(t) = \lim_{\varepsilon \to 0} g(t + \varepsilon) = 0 \qquad \text{Eq. 1.4}$$

$$g(t + \varepsilon) = 0 \qquad \text{Eq. 1.5}$$

$$-\varepsilon \frac{dg(t)}{dt} = g(t) + O(\varepsilon^2) \qquad \text{Eq. 1.6}$$

Once in perturbation form shown in Equations 1.4-1.6, the AEs can be solved first (without any ODEs, but using the given ICs for the differential variables) to find consistent initial values for all algebraic variables. The algebraic variable values found from the above perturbation approach will be consistent with the given differential variable ICs and the values can be used with the initial system of DAEs as ICs as discussed below.

Solving the DAEs Using the ICs Obtained from the AEs

When solving the system of DAEs, the set is solved in its initial form (in the example of Equations 1.1 and 1.2, a semi-explicit form), and the consistent ICs from initialization (i.e., from the Eqs. 1.4-1.6) are provided. Using this approach provides an initialization routine that produces consistent ICs to be fed into the solver along with the original system. The initialization routine allows for a wider range of initial guesses to be used for the algebraic variables of the system. Even though the above perturbation method is generally robust, the perturbation values must be small enough for the converged value of the algebraic variables to be consistent. Otherwise, if the perturbation values $\varepsilon$ are too large, the AEs may not converge to consistent ICs.

Therefore, the above procedure includes a combination of: (1) initialization using a solver for obtaining the consistent ICs of the algebraic variables, and (2) solving the DAE system using the consistent ICs obtained from (1). Instead of solving tasks (1) and (2) separately using dedicated solvers for each of the tasks, with some embodiments of the inventive technology the tasks (1) and (2) can be combined into a single-step method as follows.

Switch Function Applied to ODEs

In some embodiments, a switch function can be used to hold the differential variables static (i.e., constant or unchanged) while the algebraic variables are subjected to the perturbations to find their consistent ICs using a numerical solver. Next, the differential variables can be unmasked and the system simulation (i.e., the DAEs simulation) begins in a continuous manner using the same solver. In some embodiments, the switch function gradually applies the ICs to the DAEs without a discrete jump. Therefore, the single-step method combines the initialization of the algebraic variables (i.e., obtaining the ICs) and the solution of the system (i.e., the solution of the DAEs that describe the physical system). In at least some embodiments, the single-step approach results in more robust solutions, because the system stiffness is reduced, enabling an increase in the perturbation value used to calculate the ICs for faster calculation of the ICs.

In some embodiments, the switch function applied to the ODEs is a hyperbolic tangent:

$$T_H = \tfrac{1}{2}(1 + \tan h(q(t-t_j)))  \qquad \text{Eq. 1.7}$$

where q is a weighting factor determining the discreteness of the function, and $t_j$ is the time allowed for the perturbation approach to find consistent algebraic ICs. The value of $t_j$ can be scaled depending on the value of $\varepsilon$ used for the perturbation. Subtracting $t_j$ from the total solution time provides the original (simulation) time variable. The switch function can be applied to the ODEs as:

$$\frac{dy}{dt} = fT_H \qquad \text{Eq. 1.8}$$

The switch function allows for the derivative of the differential variables to be set to zero for the duration of the initialization of the algebraic variables and be set to the function f for the simulation after initialization. The adaptive solvers used on the system can determine time steps as needed from time t=0 to time=tj, and will find the consistent IC for z. In at least some embodiments, the switch function approximates a discrete jump with a continuous function.

The continuous nature of the switch function also allows for minor corrections of the converged ICs at the end of the initialization time (i.e., the beginning of the simulation time for the DAEs). As a result, the converged ICs allow for less restrictive perturbation values (e.g., a larger perturbation value or an initial guess that is further away from the correct value) when compared to the conventional methods in which the two steps are calculated separately. In at least some embodiments, the inventive technology also saves a considerable amount of time that the conventional two-step method needs for stopping the solver after initialization, substituting the consistent initial values, and starting the ODE solver again for simulating the entire system of DAEs. Additionally, in at least some embodiments, combining the two steps reduces the time required to properly format the set of equations for solving.

Combining the DAEs into a System of ODEs

In some embodiments, the system of DAEs (e.g., the system described by Equations 1.1 and 1.2) can be restructured into a single-step ODE system as shown in Equations 1.9 and 1.10 below:

$$\frac{dy}{dt} = fT_H \qquad \text{Eq. 1.9}$$

$$\varepsilon \frac{dg}{dt} = -g \qquad \text{Eq. 1.10}$$

In some embodiments, the perturbed form of the AEs (e.g., Equation 1.10) remains in implicit form because its left hand side incudes differential variables or their derivatives (e.g., y or dy/dt). This implicit form of Equation 1.10 may be acceptable for small sets of equations, but may cause solvers to fail for large sets of equations. Therefore, for large sets of equations, the derivatives of the equations can be removed by substituting the original ODE equations (e.g., Equation 1.1). Then ICs may be substituted for the differential variables that remain. The explicit form can be written as:

$$\varepsilon \frac{dg}{dt}\bigg|_{(at\ y=y_0, z=z_0, \frac{dy}{dt}=f_0)} = -g \qquad \text{Eq. 1.11}$$

Equation 1.11 can replace Equation 1.10 in the single-step method. As a result of the substitution, both the initialization and the solution of the system of DAEs may be obtainable by the explicit solvers. After the substitution, Equations 2.9, 2.10, and 2.11 become ODEs that can be solved using explicit solvers in time or linearly implicit solvers in time. For example, in Maple, the linearly implicit stiff solver Rosenbrock may be used to solve these systems.

FIG. 1 is a flow chart 1000 of a single-step modeling method in accordance with an embodiment of the presently disclosed technology. In step 10, a system of differential algebraic equations (DAE) is formed. Such a system of equations may represent a physical problem to be solved. In step 15, the algebraic equations (AEs) and differential equation (DEs) are separated. In step 20, the AEs can be solved by, for example, a perturbation method, to calculate the ICs from the AEs. In step 25, the DEs are combined with a switch function that holds the variables of the DEs static (e.g., constant or near constant), while the variables in the AEs find consistent values using, e.g., a perturbation method of step 20. In some embodiments, the switch function of step 25 can be tan h. In step 30, the AEs and DEs are combined into a single system of DAEs. In step 40, the algebraic values are initialized with ICs, the switch function allows solving of the DEs to start, and the DAEs are solved. In some embodiments, the DAEs can be solved using an explicit solver.

EXAMPLES

The examples below illustrate some applications of the single-step method. Some of the described examples are directed to a stiff electrochemical system. The examples include solving implicit ordinary differential equations (ODE) systems after converting them into a DAE form. The method described with respect to FIG. 1 is applied to Examples 1-5 below. In the Figures that show simulation results for examples 1-5, the initialization time is shown as negative, and the real simulation time of the problem is shown as positive.

Example 1

Index-1 DAE (One Algebraic and One Differential Variable)

In the system of equations below, y is the differential variable and z is the algebraic variable:

$$\frac{dy(t)}{dt} = -y(t)^2 + z(t) \quad \text{Eq. 1.12}$$

$$\cos(y(t)) - \sqrt{z(t)} = 0 \quad \text{Eq. 1.13}$$

For the system of Equations 1.12 and 1.13, the differential variable IC can be set as:

$$y(0) = 0.25 \quad \text{Eq. 1.14}$$

For conventional methods, standard DAE solvers need the consistent IC for z:

$$z(0) = \cos(0.25)^2 \approx 0.938791 \quad \text{Eq. 1.15}$$

Standard solver packages may fail when the exact algebraic IC is not given (e.g., if the solver did not include initialization routines). The single-step proposed approach is applied below. A switch function is defined as:

$$T_H = \tfrac{1}{2}(1 + \tan h(1000)(t-1))) \quad \text{Eq. 1.16}$$

This switch function can be applied to the right hand side of the differential equation (DE) so that:

$$\frac{dy(t)}{dt} = (-y(t)^2 + z(t))\left(\frac{1}{2} + \frac{1}{2}\tanh(1000(t-1))\right) \quad \text{Eq. 1.17}$$

Additionally, a perturbation can be applied to the algebraic equation (AE) such that $$\varepsilon\left(\sin(y(t))\left(\frac{dy(t)}{dt}\right) + \frac{1\sqrt{z(t)}}{2z(t)}\frac{dz(t)}{dt}\right) = \cos(y(t)) - \sqrt{z(t)} \quad \text{Eq. 1.18}$$

The system of Equations 1.16 and 1.17 can be solved with an explicit (or linearly implicit) ODE solver. The IC of the algebraic variable does not have to be known a priori, but rather the combination of the switch function and perturbation can allow the IC for the algebraic variable to reach steady state during the first one second of the solution time, because $T_H$ will be 0, therefore holding the differential variable constant during this initialization. After one second of the solution time, $T_H$ achieves value one, and the solution of the system 1.16, 1.17 will start based on the ICs. In at least some embodiments, a reasonable initial guess must still be provided for the starting value of z. The time of initialization must be removed from the solution time in order to achieve the real simulation time of the system.

When compared to the conventional two-step perturbation approach, in some embodiments of the inventive technology the addition of the switch function allows for the initialization and solution to be calculated together in a single-step. In both the conventional two-step and the inventive single-step approaches, the algebraic variables generally converge to the same value for the same perturbation parameter ε. In general, smaller values of ε increase the accuracy of the converged value by ensuring that the converged value can be used as a consistent IC. However, a relatively small ε also increases the stiffness of the system. Conversely, a larger ε reduces the stiffness, but decreases the accuracy of the converged value. Furthermore, when ε becomes large enough, the converged value no long works as a consistent IC for a system of DAEs. The conventional two-step perturbation approach also typically requires much smaller values of perturbation for the initialization, therefore requiring a greater computational effort. Conversely, a too large E causes the two-step approach to fail once the converged value is outside of the consistent IC limit.

Unlike the conventional two-step method, the single-step method allows for a correction to the converged value at the end of initialization because of the continuous nature of the switch function. For instance, as the switch function starts to unfreeze the ODE variables, the converged value of the algebraic variable (as well as the IC for the differential variable) can further correct to consistent values. This correction will introduce a small amount of error, but it allows for a more robust method of solving by increasing the allowable converged value for the algebraic variables which will still solve the DAEs of the system.

In the example 1, the conventional two-step approach using Maple's dsolve (a Rosenbrock type solver) requires a converged value y(0) to satisfy:

$$0.9387903 < y(0) < 0.9387922 \quad \text{Eq. 1.19}$$

For the inventive single-step method that uses the switch function, the system of Equations 1.12, 1.13 can be solved with less than 0.001 error for all points after t=0.1 s of simulation time even if the requirement for the converged values y(0) is relaxed to:

$$0.9377018 < y(0) < 0.9398806 \quad \text{Eq. 1.20}$$

In at least some embodiments, a wider range of acceptable y(0) may increase the robustness of the solver and may allow for a wider allowable range of perturbation parameter ε. For example, if a starting guess of z(0)=0.8 was applied, the conventional two-step perturbation solution would require no larger than $\varepsilon = 1.1 \times 10^{-6}$ in order to obtain a solution for initialization that is consistent for the system of DAEs. However, the inventive technology that uses a single-step method can solve the same system of equations with ε=0.1 (or even larger), as discussed with reference to FIG. 2 below.

Figure 2:
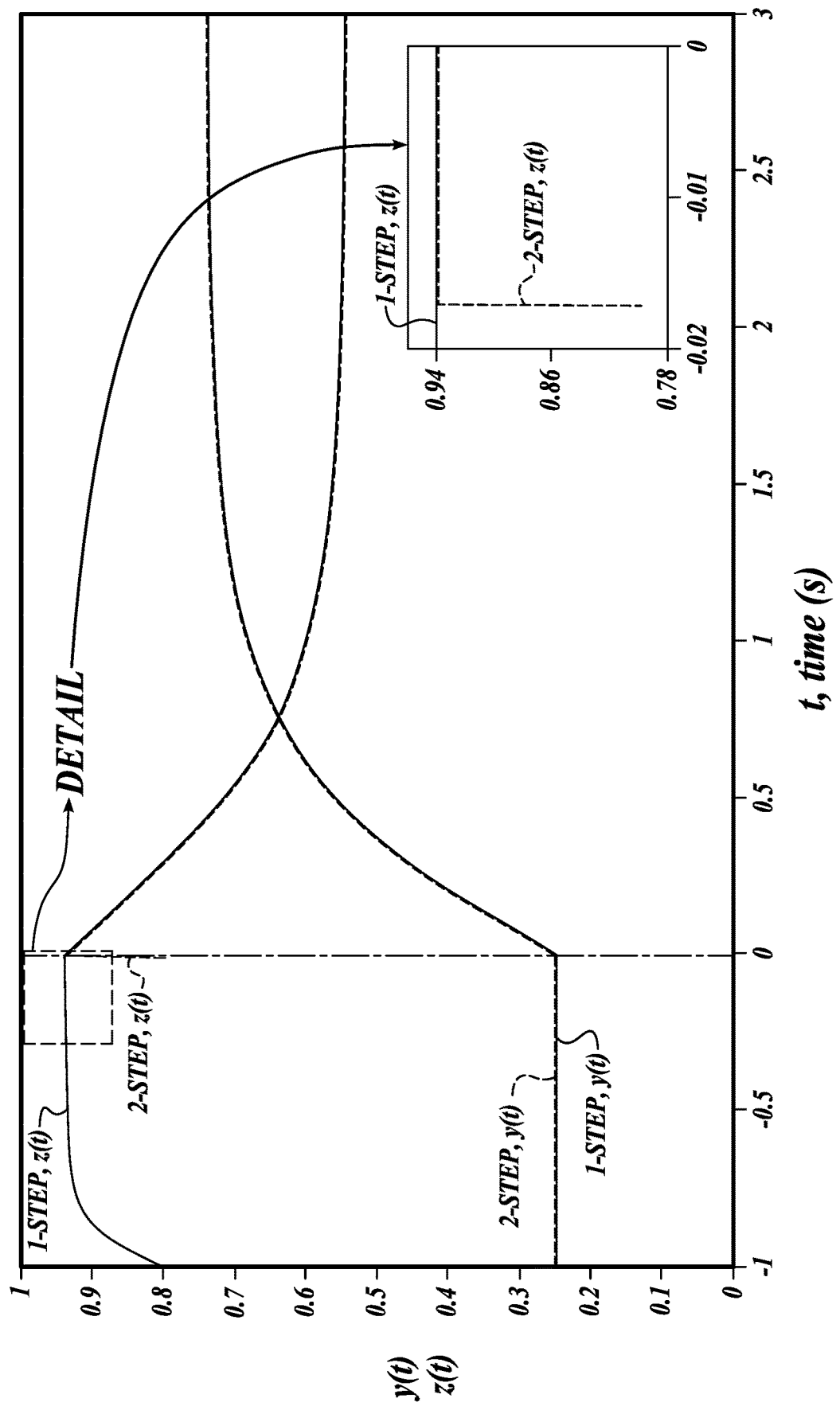
FIG. 2 is a graph of comparison between the conventional two-step method and inventive single-step method in accordance with an embodiment of the presently disclosed technology.

FIG. 2 is a graph of results comparison between the conventional two-step method and inventive single-step method in accordance with an embodiment of the presently disclosed technology. The horizontal axis represent the time in seconds. The vertical axis represents values of y(t) and z(t) from the system of Equations 1.12, 1.13. The value q in Equation 1.7 is set to 1000. In at least some embodiments, the value of q affects the discreteness of the switch function and can increase the robustness of the solution. A detail graph shows the initialization of z(t) for the times that are close to t=0. FIG. 2 illustrates that both the conventional two-step method and the inventive single-step method can solve the system of Equations 1.12, 1.13. However, as explained in more detail with reference to FIGS. 3 and 4 below, the inventive single-step method can produce accurate results for a relatively wide ranges of initial guesses of z(t) (FIG. 3) and perturbation parameters ε (FIG. 4).

Figure 3:
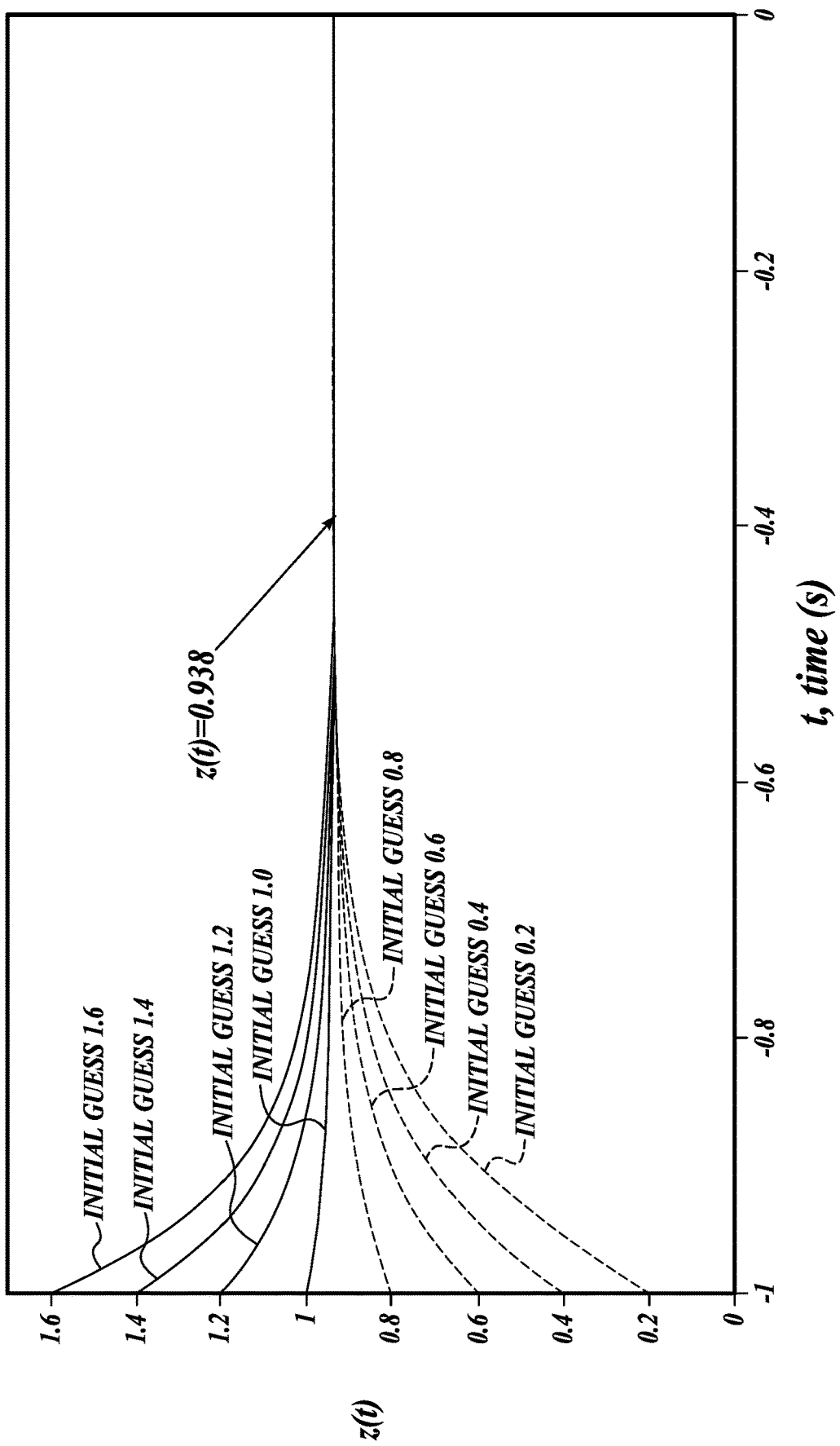
FIG. 3 is a graph of initialization periods for different initial algebraic guesses in the single-step method in accordance with an embodiment of the presently disclosed technology.

FIG. 3 is a graph of initialization periods for different initial algebraic guesses in the single-step method in accordance with an embodiment of the presently disclosed technology. FIG. 3 shows the initialization period for 8 different initial algebraic guesses where ε=0.1 and $t_1$=1 for all cases. All of the guesses (z(−1)=0.2-1.6) converge to the consistent IC of z(0)=0.938, and can be used to accurately solve the system of DAEs. Therefore, the system of Equations 1.12, 1.13 can be solved for a relatively wide range of initial guesses (0.2-1.6) of the algebraic variable z(t), which is normally not the case for the conventional two-step method, unless a very small perturbation parameters ε is used.

Figure 4:
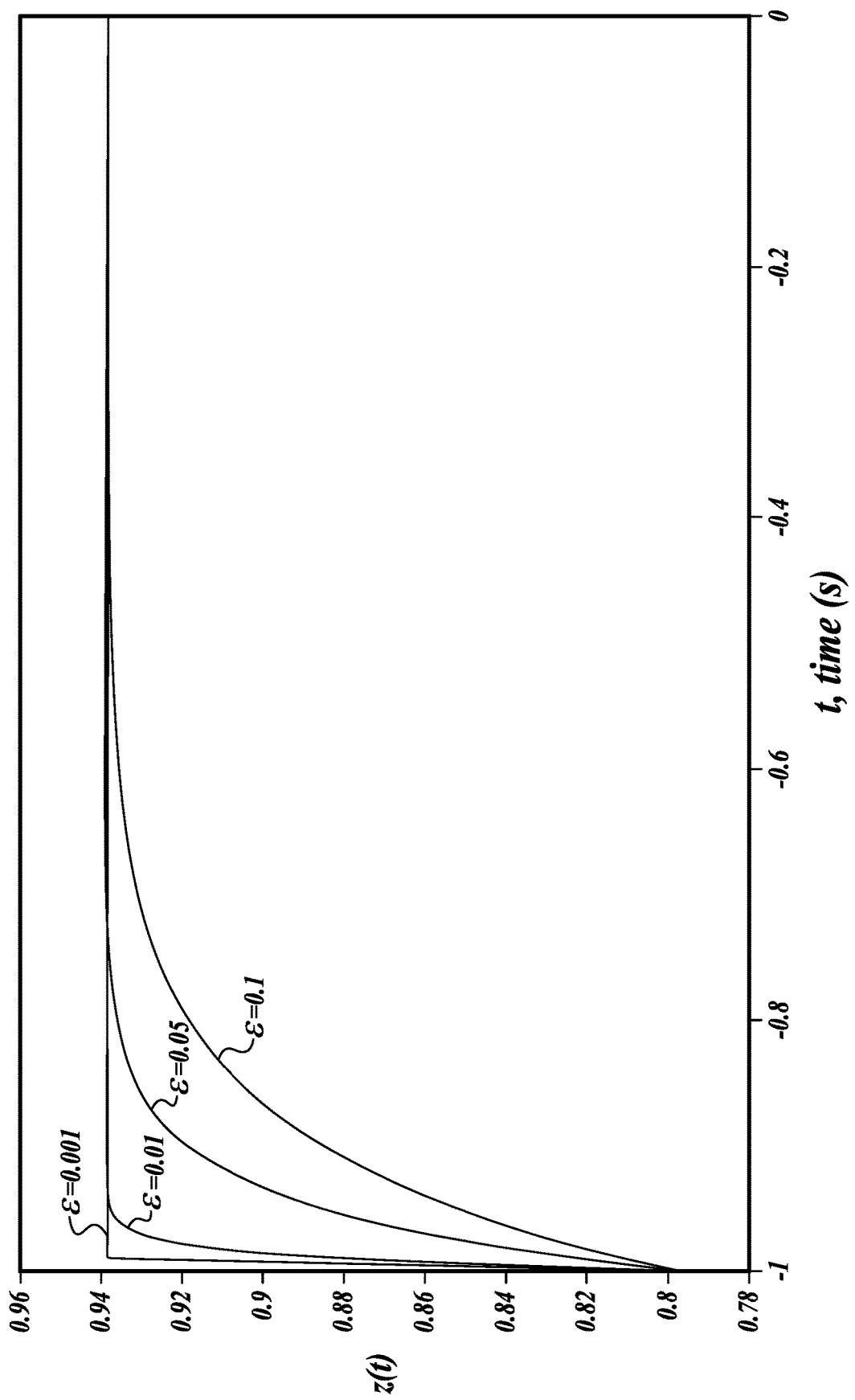
FIG. 4 is a graph of a convergence for several different perturbation values in accordance with an embodiment of the presently disclosed technology.

FIG. 4 is a graph of a convergence for several different perturbation values ε (ε=0.1, 0.05, 0.01, 0.001) in accordance with an embodiment of the presently disclosed technology. Generally, the perturbation value ε may affect the accuracy and convergence of the initialization. For example, smaller values of ε allow the initialization to converge over shorter simulation time t. Conversely, larger values of ε may result in an initialization that is not accurate enough (at a relatively short t) to satisfy the consistency condition. As illustrated in FIG. 4, the range of perturbation values ε that spans two orders of magnitude (i.e., 0.001 to 0.1) still results in a consistent value of z(t) of about 0.938, thus demonstrating a robustness of the inventive single-step method.

Example 2

Wu and White Problem

Example 2 includes a two equation system representing a thin film nickel hydroxide electrode during the charging process. For at least some realistic values of the variable, the determination of consistent ICs would be difficult for the conventional two-step method. The system is represented by the following equations:

$$\frac{\rho V}{W}\frac{dy(t)}{dt} = \frac{j_1}{F} \quad \text{Eq. 1.21}$$

$$j_1 + j_2 - i_{app} = 0 \quad \text{Eq. 1.22}$$

Where, $$j_1 = i_{o,1}\left[2(1 - y(t))\exp\left(\frac{(z(t) - \phi_1)F}{2RT}\right) 2y(t)\exp\left(\frac{(z(t) - \phi_1)F}{2RT}\right)\right] \quad \text{Eq. 1.23}$$

$$j_2 = i_{o,2}\left[\exp\left(\frac{(z(t) - \phi_2)F}{RT}\right) - \exp\left(\frac{(z(t) - \phi_2)F}{2RT}\right)\right] \quad \text{Eq. 1.24}$$

The differential variable y represents the nickel hydroxide mole fraction and the algebraic variable z represents the potential difference at the solid liquid interface. The parameters of the system are given in Table 1.

TABLE 1

Parameters for Nickel Hydroxide Electrode.

| Symbol | Parameter | Value | Units |
| --- | --- | --- | --- |
| F | Faraday Constant | 96487 | C/mol |
| R | Gas Constant | 8.3143 | J/(mol K) |
| T | Temperature | 303.15 | K |
| $\phi_1$ | Equilibrium potential | 0.42 | V |
| $\phi_2$ | Equilibrium potential | 0.303 | V |
| W | Mass of active material | 92.7 | g |
| V | Volume | $1 \times 10^{-5}$ | $m^3$ |
| $i_{o1}$ | Exchange current density | $1 \times 10^{-4}$ | $A/cm^2$ |
| $i_{o2}$ | Exchange current density | $1 \times 10^{-10}$ | $A/cm^2$ |
| $i_{app}$ | Applied current | $1 \times 10^{-5}$ | $A/cm^2$ |
| ρ | Density | 3.4 | $g/cm^3$ |

In a discharged state the mole fraction of the nickel hydroxide is estimated to be:

$$y(0) = 0.05 \quad \text{Eq. 1.25}$$

Under the algebraic constraint the consistent IC for the potential must be:

$$z(0) \approx 0.350236 \quad \text{Eq. 1.26}$$

Several imaginary roots are also solutions to the algebraic constraint, but these are non-physical solutions. Therefore, the imaginary roots are excluded from the set of solutions as not applicable.

Table 2 shows the range of possible ICs for the algebraic variable that provides a solution for different solvers including the proposed single-step approach. The conventional methods use the first four solvers listed in Table 2 below. With the conventional methods, the solvers require initial guesses that are very close to the consistent values, for example ranging from z(0)=0.3502359 to z(0) being within a range from −1.27 to 1.87. However, with the inventive single-step method, the possible range of ICs is widened to the range from −9.13 to 9.85.

TABLE 2

Comparison of working ranges of initial algebraic guesses

| Solver | Working range of initial guess |
| --- | --- |
| Conventional method with Maple dsolve | z(0) = 0.3502359, Exact conditions required |
| Conventional method with Matlab ode15i | 0.342 < z(0) < 0.365 |
| Conventional method with Matlab ode15s | 0.271 < z(0) < 0.474 |
| Conventional method with SUNDIALS IDA | −1.27 < z(0) < 1.87 |
| Single-step method with Maple dsolve | −9.13 < z(0) < 9.85 |

Figure 5:
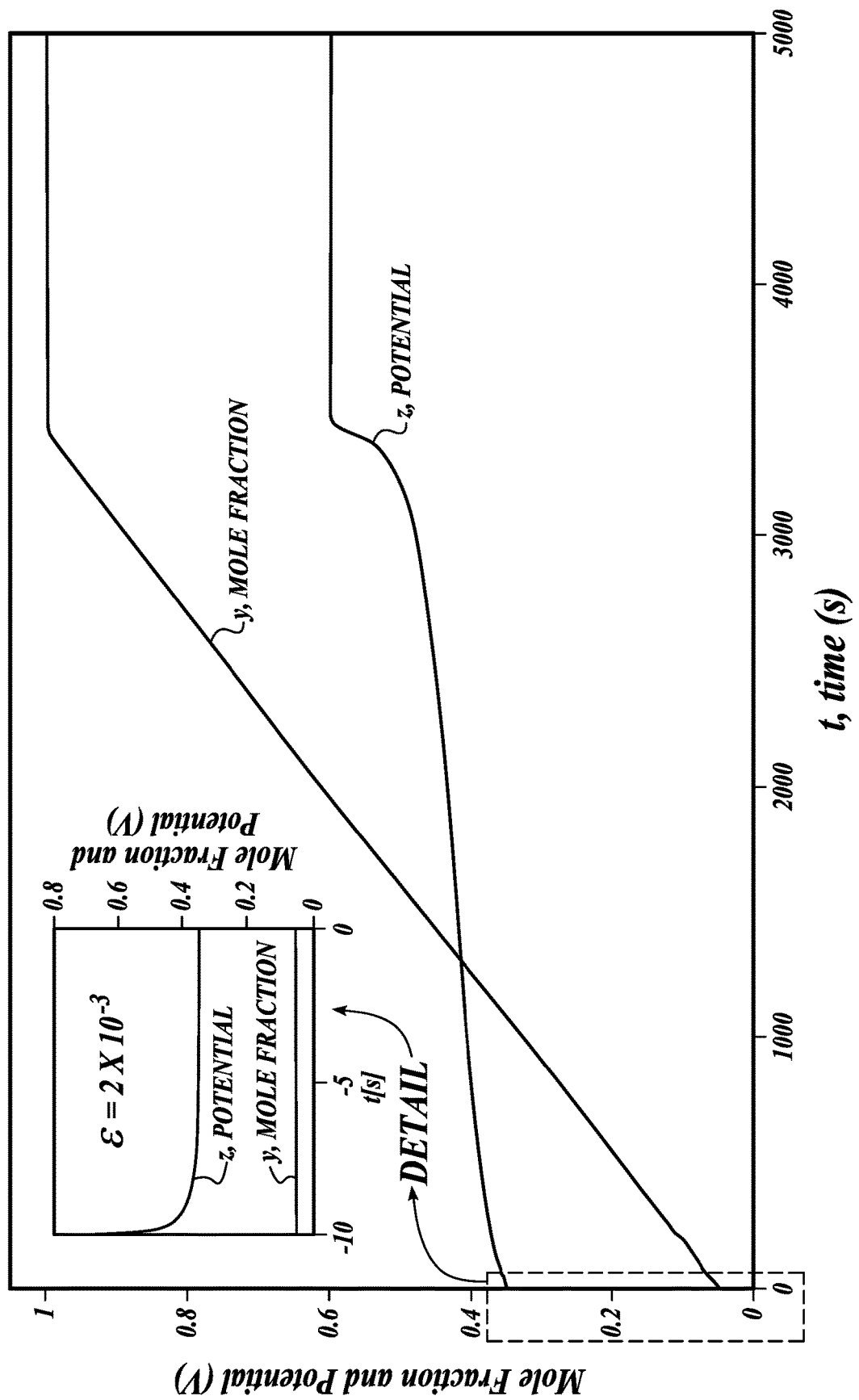
FIG. 5 is a graph of the single-step solution for a full charge of an electrode in accordance with an embodiment of the presently disclosed technology.

FIG. 5 is a graph of the single-step solution for a full charge of an electrode of a battery in accordance with an embodiment of the presently disclosed technology. Here, the initial guess of z(0)=0.7 and the perturbation parameter ε=0.002 were used. As shown in Table 2 above, such an initial guess results in a converged solution for the inventive single-step method, whereas the conventional methods fail because the initial guess is too far from the true physical value of z(0). For at least some embodiments, for example for systems where the ICs are not easily available or obvious from the physical system, the expanded range of possible initial guesses may be important for obtaining a physical solution. As shown in FIG. 5, the values of mole fraction y and potential z reach their final values at about 3,500 seconds. Therefore, in some embodiments, the time of 3,500 seconds signifies the end of the battery charging process.

Example 3

Implicit ODE Converted to DAE, and Solved with Explicit Solver

In some embodiments, the inventive technology can be used to solve implicit ODEs. An example of such implicit ODE is shown below:

$$\left(\frac{dy(t)}{dt}\right)^2 + \left(\frac{dy(t)}{dt}\right)(y(t) + 1) + y(t) = \cos\left(\frac{dy(t)}{dt}\right) \quad \text{Eq. 1.27}$$

Generally, the problem described by Equation 1.27 cannot be directly solved using the explicit solvers in Maple. When attempting to use the direct solvers, Maple states that IC for dy/dt is not known or the system cannot be converted to the explicit ODE form. However, including a substitution:

$$\frac{dy(t)}{dt} = z(t) \quad \text{Eq. 1.28}$$

converts Eq. (3.16) into:

$$z(t)^2 + z(t)(y(t)+1) + y(t) = \cos(z(t)) \quad \text{Eq. 1.29}$$

In at least some embodiments, the newly added variable z makes it possible to use the inventive single-step method. For example, Equations 1.28 and 1.29 can be rewritten as:

$$\varepsilon\left(2z(t)\frac{dz(t)}{dt} + \frac{dz(t)}{dt}(y(t)+1) + z(t)\frac{dy(t)}{dt} + \frac{dy(t)}{dt} + \sin(z(t))\frac{dz(t)}{dt}\right) = z(t)^2 + (t)(y(t)+1) + y(t) - \cos((t))$$

Eq. 1.30

$$\frac{dy(t)}{dt} = z(t)\left(\frac{1}{2} + \frac{1}{2}\tanh(1000(t-1))\right)$$

Figure 6:
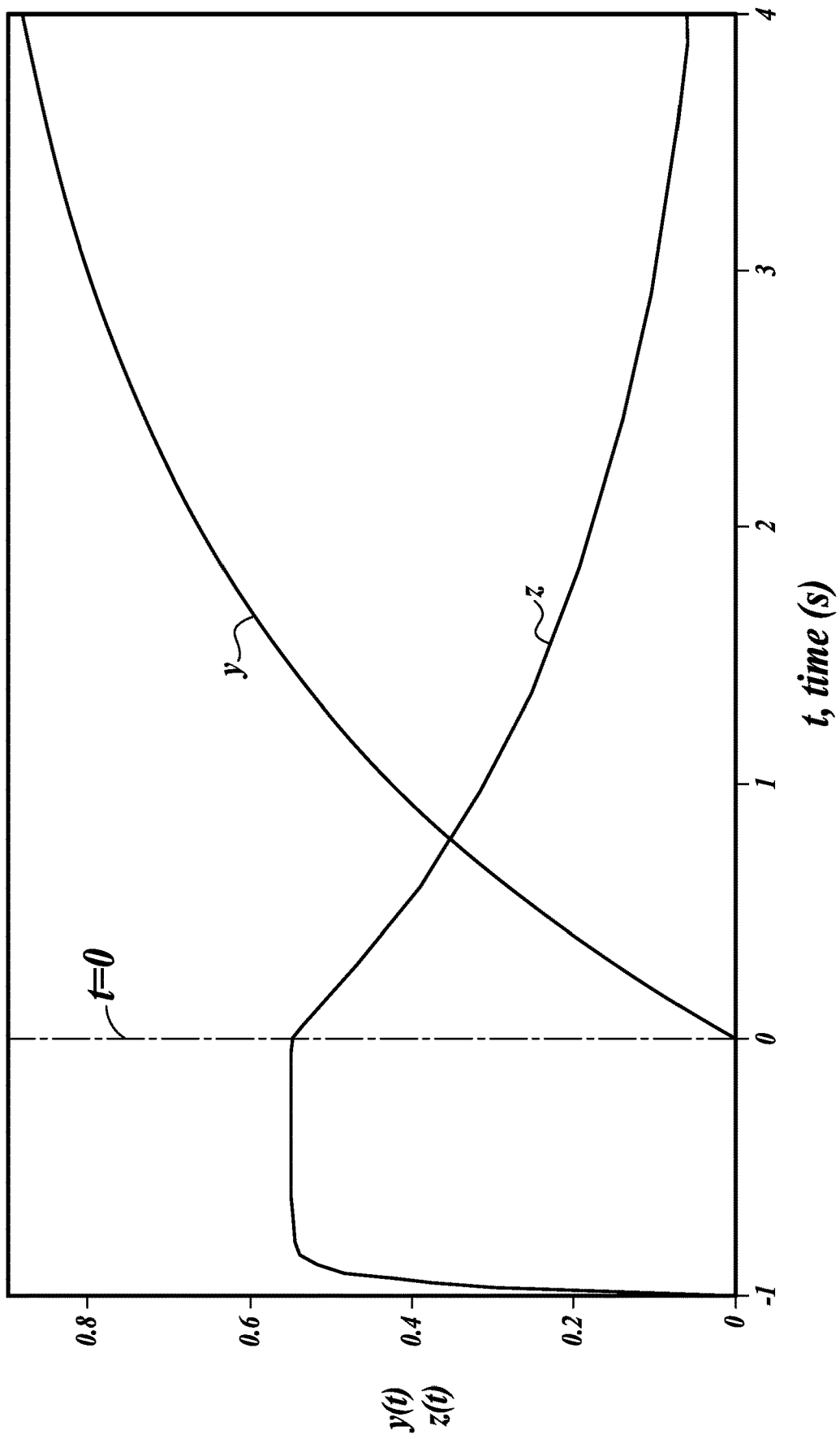
FIG. 6 is a graph of an initialization and a simulation for the single-step method in accordance with an embodiment of the presently disclosed technology.

Eq. 1.31 where q=1000 and $t_j$=1 for the switch function. FIG. 6 is a graph of an initialization and a simulation for the single-step for the system of Equations 1.30, 1.31 solved using $\varepsilon$=0.1 with the ICs of:

$$y(0)=0, z(0)=0$$

Eq. 1.32

The converged value for z(0) (at t=0) from the initialization portion of the solver is 0.55. After t=0, the simulation produces a decreasing value of z and an increasing value of y as illustrated in the graph of FIG. 6.

Example 4

Partial Differential Equations (PDEs) Discretized to DAEs

As explained above, the PDEs can be discretized into a system of DAEs. At least some of these systems include variables with explicit time derivatives (e.g., a concentration) and static variables (e.g., a potential which may not include time derivatives, but can still change with time because other variables in the system change with time). An example of such a system is shown in the following set of PDEs:

$$\frac{\partial y}{\partial t} = \frac{\partial^2 y}{\partial x^2} - y(1+z)$$

Eq. 1.33

$$\frac{\partial^2 z}{\partial x^2} = (1-y^2)\exp(-z)$$

Eq. 1.34

The above system of Equations 1.33, 1.34 may have the following boundary conditions:

$$\frac{\partial y}{\partial x}\bigg|_{x=0} = 0 \quad y|_{x=1} = 1$$

Eq. 1.35

$$\frac{\partial y}{\partial x}\bigg|_{x=0} = 0 \quad z|_{x=1} = 0$$

Eq. 1.36

Though $\partial z/\partial t$ is not present in the system, z can change with time as y changes with time. The system of Equations 1.33, 1.34 can be solved using numerical method of lines which discretize the spatial derivatives over a series of node points between the system's boundaries. When discretizing for the spatial variable the system becomes:

$$\frac{dy_i}{dt} = \frac{1}{h^2}(y_{i+1} - 2y_i + y_{i-1}) - y_i(1+z_i)$$

Eq. 1.37

$$\frac{1}{h^2}(z_{i+1} - 2z_i + z_{i-1}) = (1-y_i^2)\exp(-z_i)$$

Eq. 1.38 where h is the length between node points. The boundary conditions 1.35, 1.36 become:

$$\frac{1}{2h}(3y_0 - 4y_1 + y_2) = 0 \quad y_{N+1} = 1$$

Eq. 1.39

$$\frac{1}{2h}(3z_0 - 4z_1 + z_2) = 0 \quad z_{N+1} = 0$$

Eq. 1.40 where N is the number of interior node points of the system. When the single-step method is used, the system of Equations 1.35, 1.36 becomes:

$$\frac{dy_i}{dt} = \left[\frac{1}{h^2}(y_{i+1} - 2y_i + y_{i-1}) - y_i(1+z_i)\right]\left(\frac{1}{2} + \frac{1}{2}\tanh(1000(t-1))\right)$$

Eq. 1.41

$$\frac{-\varepsilon}{h^2}\left[\frac{dz_{i+1}}{dt} - 2\frac{dz_i}{dt} + \frac{dz_{i-1}}{dt} + 2y_i\frac{dy_i}{dt}\exp(-z_i) + (1-y_i^2)\frac{dz_i}{dt}\exp(-z_i)\right] = (1-y_i^2)\exp(-z_i) - \frac{1}{h^2}(z_{i+1} - 2z_i + z_{i-1})$$

Eq. 1.42

The boundary conditions can be rewritten as:

$$\frac{-\varepsilon}{2h}\left[3\frac{dy_0}{dt} - 4\frac{dy_1}{dt} + \frac{dy_2}{dt}\right] = \frac{1}{2h}(3y_0 - 4y_1 + y_2) - \varepsilon\frac{dy_{N+1}}{dt} = y_{N+1} - 1$$

Eq. 1.43

$$\frac{-\varepsilon}{2h}\left[3\frac{dy_0}{dt} - 4\frac{dy_1}{dt} + \frac{dy_2}{dt}\right] = \frac{1}{2h}(3z_0 - 4z_1 + z_2) - \varepsilon\frac{dy_{N+1}}{dt} = z_{N+1}$$

Eq. 1.44

The conventional two-step method using the standard solvers cannot solve Equations 1.41, 142 for a large number N using explicit solvers. Even with consistent ICs $y_i(0)$=1 and $z_i(0)$=0), N must be five or less to solve the system using Maple's dsolve. With the conventional two-step method, Maple attempts to convert the DAE system to an explicit ODE system of the form dy/dt=f. This attempt fails for larger values of N. However, when using the single-step method, the restrictions on the number of interior node points are relaxed, and the solving speed in Maple is increased without having to use solvers involving Newton type iterations. In some embodiments, larger values of N may be required for higher accuracy and better convergence.

Figure 7:
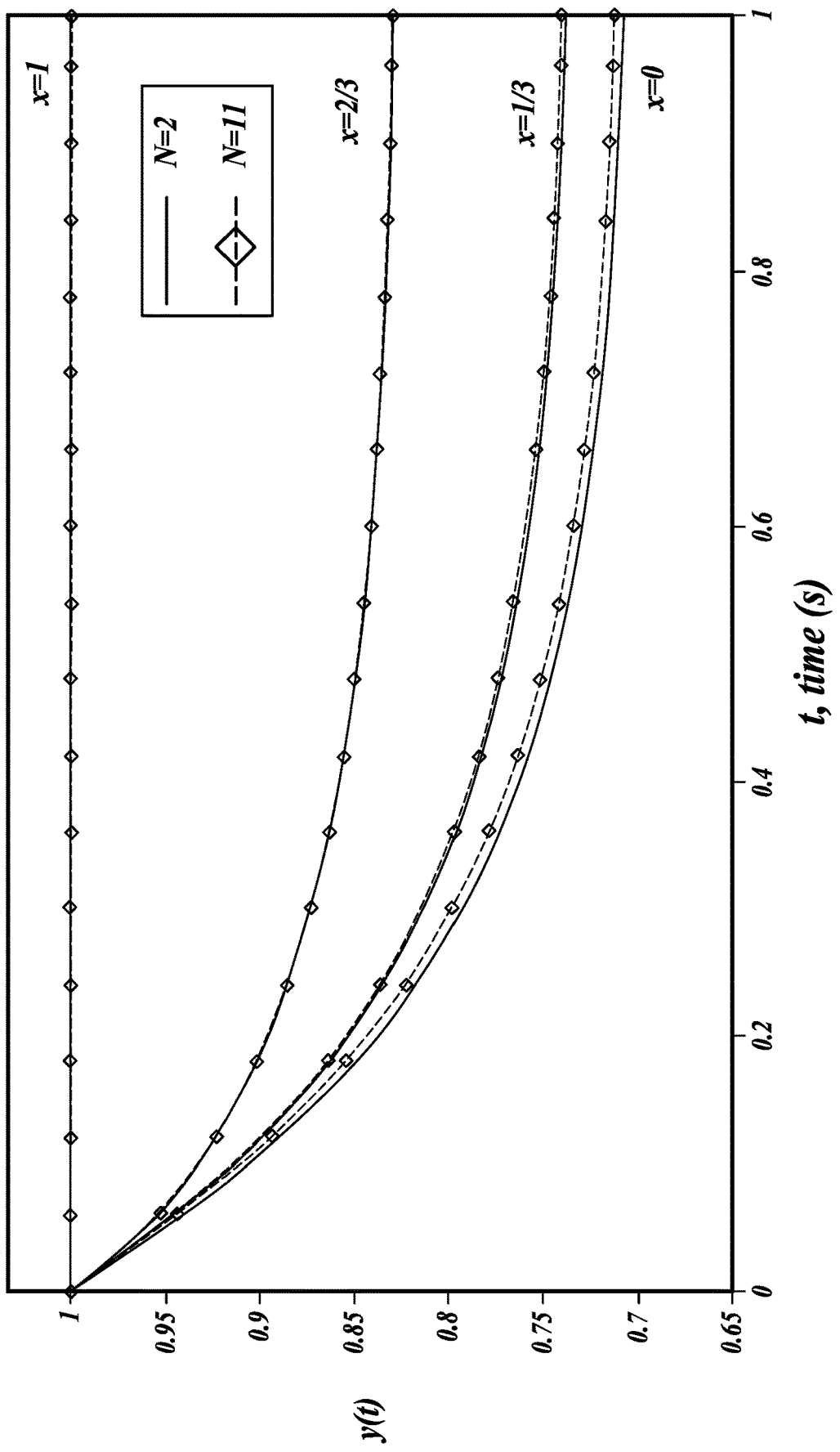
FIG. 7 is a graph of a solution of ADE; DAEs using the single-step method and Maple dsolve routine in accordance with an embodiment of the presently disclosed technology.

FIG. 7 is a graph of a solution of DAEs 1.33, 1.34 using the single-step method and Maple dsolve routine in accordance with an embodiment of the presently disclosed technology. FIG. 7 shows the value of y at x=0, ⅓, ⅔, and 1 for N=2 and N=11 with $\varepsilon$=1×10$^{-5}$). Consistent ICs ($y_i(0)$=1 and $z_i(0)$=0) were used for FIG. 7. The values at N=11 have converged to more accurate values, especially for values closer to x=0. The proposed approach can use the standard Maple dsolve solver to solve for more internal node points, without having to use direct DAE solvers that use Newton- Raphson type iterations. Furthermore, even at low node points the proposed approach is faster than standard solving techniques. For example, at N=5, using the single-step method Maple dsolve produces a solution in 159 ms, which is over an order of magnitude faster than the conventional two-step technique. A comparison of computational time required for the two-step and single-step methods is shown in Table 3.

TABLE 3

Computational time needed to solve Example 4

| Internal Node points, N | Two-step method using Maple dsolve | Two-step method using BESIRK | Single-step method using Maple dsolve |
| --- | --- | --- | --- |
| 3 | 0.172 | 0.359 | 0.094 |
| 4 | 0.561 | 0.468 | 0.25 |
| 5 | 1.981 | 0.642 | 0.156 |

TABLE 3-continued

Computational time needed to solve Example 4

| Internal Node points, N | Two-step method using Maple dsolve | Two-step method using BESIRK | Single-step method using Maple dsolve |
| --- | --- | --- | --- |
| 10 | N/A | 1.653 | 0.25 |
| 20 | N/A | 6.334 | 0.577 |
| 50 | N/A | 56.956 | 3.338 |
| 100 | N/A | 375.572 | 13.479 |

Example 5

Finite Difference Single Particle Model

In some embodiments of physical battery systems, when discretizing systems of PDEs that contain time derivatives in all the governing equations, the boundary conditions can yield algebraic equations. The electrochemistry occurring in an intercalation based secondary battery can be described by a single particle model (SPM). In some embodiments, the SPM can be used to model battery cycling as a good model for batteries with thin electrodes and low charge and discharge rates. The SPM tracks the diffusion of lithium inside the electrode particles of Li-ion batteries governed by Fick's second law of diffusion:

$$\frac{\partial c_i}{\partial t} = \frac{1}{r^2}\frac{\partial}{\partial r}\left(r^2 D_i \frac{\partial c_i}{\partial r}\right), \; i = p, n \qquad \text{Eq. 1.45}$$

with boundary conditions:

$$\left.\frac{\partial c}{\partial r}\right|_{r=0} = 0 \quad \left.\frac{\partial c_i}{\partial r}\right|_{r=R_i} = -\frac{j_i}{D_i} \qquad \text{Eq. 1.46}$$

where $$j_i = \frac{\pm i_{app}}{a_i l_i F} = \pm 2 k_i c_e^{0.5}(c_{i,max} - c_{i,surf})^{0.5} c_{i,surf}^{0.5} \sinh\left(\frac{F(\Phi_i - U_i)}{2RT}\right) \qquad \text{Eq. 1.47}$$

The parameters for the system described by Equations 1.45-1.47 are given in Table 4.

TABLE 4

Parameters for Single Particle Model

| Symbol | Parameter | Value | Units |
| --- | --- | --- | --- |
| F | Faraday Constant | 96487 | C/mol |
| R | Gas Constant | 8.3143 | J/(mol K) |
| T | Temperature | 303.15 | K |
| $c_e$ | Electrolyte concentration | 1000 | mol/m$^3$ |
| $i_{app}$ | Applied current | 1 | C |

| | | Cathode (p) | Anode (n) | |
| --- | --- | --- | --- | --- |
| D | Solid phase Diffusion Coefficient | 1.0 × 10$^{-14}$ | 3.9 × 10$^{-14}$ | m$^2$/s |
| a | particle surface area to volume | 8.85 × 10$^5$ | 7.236 × 10$^5$ | m$^2$/m$^3$ |
| $c_{max}$ | Maximum lithium concentration | 51555 | 30555 | mol/m$^3$ |
| l | Cell thickness | 80 × 10$^{-6}$ | 88 × 10$^{-6}$ | m |
| R | Electrode particle radius | 2 × 10$^{-6}$ | 2 × 10$^{-5}$ | m |
| $k_o$ | Reaction rate | 2.334 × 10$^{-11}$ | 5.0307 × 10$^{-11}$ | m$^{2.5}$/(mol$^{0.5}$s) |
| U | Overpotential | is a function of state-of-charge | | |

The system described by Equations 1.45-1.47 can be solved using numerical method of lines which discretize the spatial derivatives over a series of node points, N, within the particle, while the time derivative remains. This discretization creates a DAE system with 2N differential equations and four algebraic equations (the boundary conditions). The system can be solved for the concentration of lithium at every node point in the electrodes and then the electrode potentials, Φ, can be determined from the electrode surface concentrations. In some embodiments, a discharged state the initial concentration for lithium throughout the electrodes is:

$$c_p(0) = 305.55 \; c_n(0) = 49503.11 \qquad \text{Eq. 1.48}$$

with units of mol/m$^3$. When written in finite difference form (using a third order Euler forward approach) and applying the single-step method, the modeled system becomes:

$$\frac{dc_{i,j}}{dt} = \frac{D_i}{j^2 h^2 R_i^2}[c_{i,j+1}(j^2 + j) + c_{i,j-1}(j^2 - j) - 2j^2 c^{i,j}] \qquad \text{Eq. 1.49}$$

$$\left(\frac{1}{2} + \frac{1}{2}\tanh(1000(t-1))\right)$$

with boundary conditions converted to:

$$\frac{-\varepsilon}{2h}\left(4\frac{dc_{i,1}}{dt} - \frac{dc_{i,2}}{dt} - 3\frac{dc_{i,0}}{dt}\right) = 4c_{i,1} - c_{i,2} - 3c_{i,0} \qquad \text{Eq. 1.50}$$

$$\frac{-\varepsilon}{2h}\left(4\frac{dc_{i,N}}{dt} - \frac{dc_{i,N-1}}{dt} - 3\frac{dc_{i,N+1}}{dt}\right) = \qquad \text{Eq. 1.51}$$

$$4c_{i,N} - c_{i,N-1} - 3c_{i,N+1} - \frac{j_i}{D_i}$$

Figure 8:
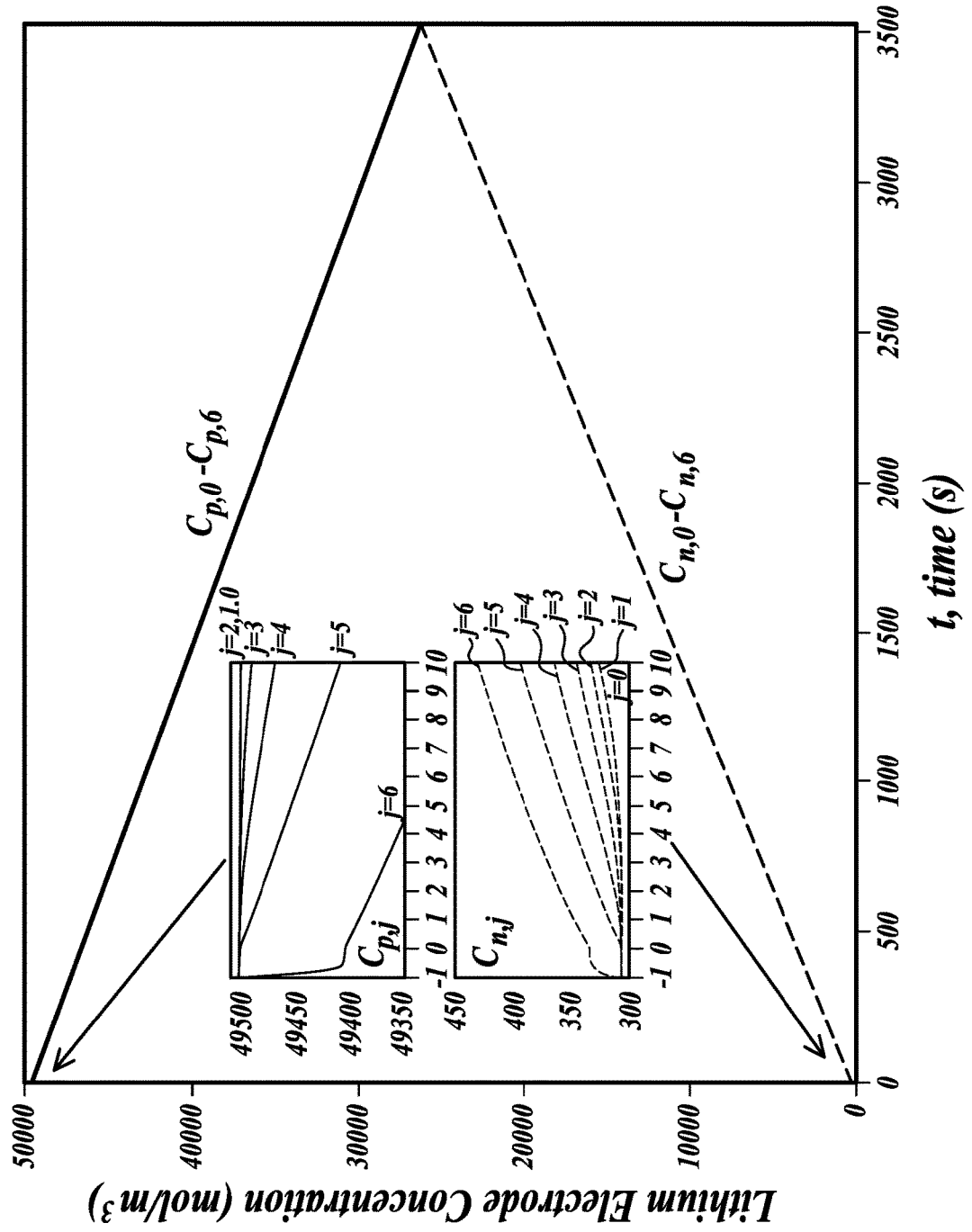
FIG. 8 is a graph of a solution of a single particle model using the single-step method and Maple dsolve routine in accordance with an embodiment of the presently disclosed technology.

Results for the concentration values (using five internal node points N) at individual and boundary points are shown in FIG. 8. The inset shows the difference in concentration values at short times, and the ability of the proposed approach to converge to the initial conditions for all concentrations. With the conventional two-step model using the Rosenbrock stiff solver in MAPLE, the system can be solved for a complete 1C rate charge with up to 58 internal node points before the solver fails due to memory constraints. When using the single-step method, the same system under the same memory constraints can be solved for over 2500 internal node points. The ICs for both cases are shown in Equation 1.48. The switch function was applied with $t_j=1$ and $q=1000$, and the perturbation value was $\varepsilon=1\times10^{-5}$. The system was solved with a Rosenbrock solver under both standard FD scheme using the single-step method.

Table 5 shows the solving speed for simulating the lithium concentration throughout the electrode particles for a range of node points.

TABLE 5

| | Computational time | |
|---|---|---|
| Internal node points, N | Standard FD Comp time (ms) | Proposed single step Comp time (ms) |
| 5 | 111 | 55 |
| 25 | 3340 | 94 |
| 50 | 23715 | 200 |
| 100 | N/A | 404 |
| 500 | N/A | 4377 |

For example, for a SPM with 50 internal node points, resulting in a system of 4 AEs and 100 ODEs, the single-step method reduced computational time by two orders of magnitude (from 23,715 ms to 200 ms). In some embodiments, the single-step method reduces the computational burden on the solver, therefore enabling the solver to solve larger systems.

Battery Charging System

Figure 9:
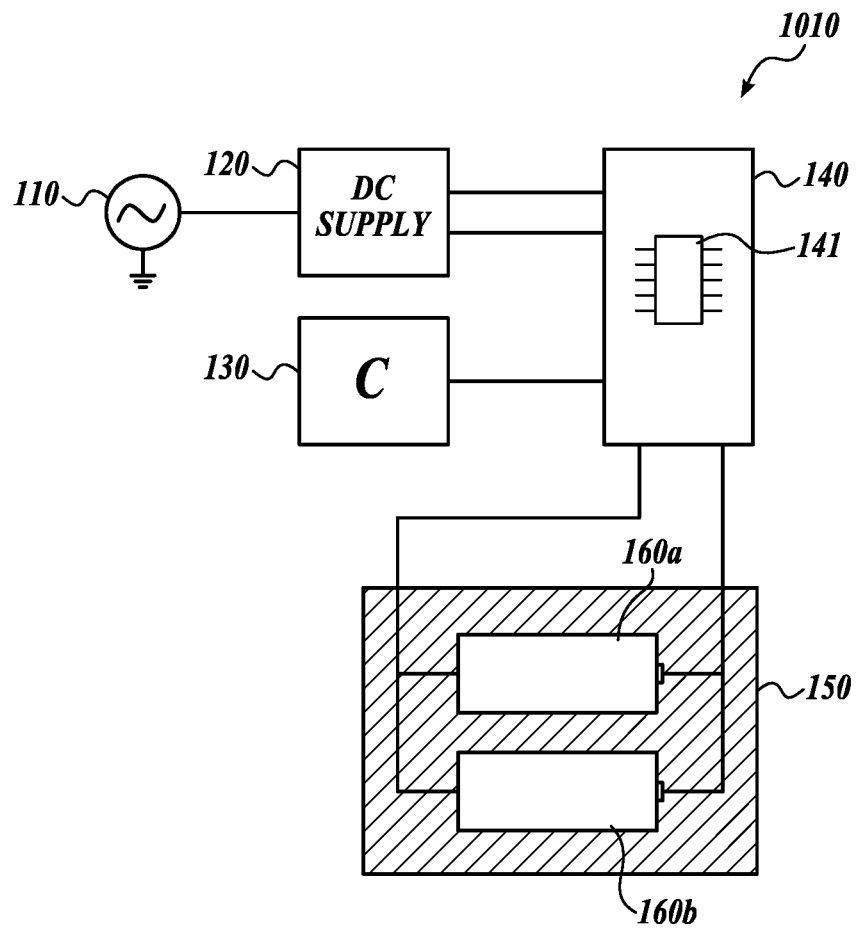
FIG. 9 is a partially schematic view of a battery charging system in accordance with an embodiment of the presently disclosed technology.

FIG. 9 is a partially schematic view of a battery charging system 1010 in accordance with an embodiment of the presently disclosed technology. In some embodiments, the battery charging system 1010 may include a power supply 110 and a DC supply 120 that provides power to an electronics board 140. The electronics board 140 may include several components including a programmable chip 141 (e.g., an EPROM). A battery charging housing 150 may include one or more rechargeable batteries 160a, 160b. In some embodiments, the battery charging housing may be replaced by connectors that are electrically connected to the electronics board 140 with conductive wires.

The Operation of the DC supply 120 and/or the electronics board 140 may be controlled by a controller 130. For example, the controller 130 may load data onto the programmable chip 141 that, in turn, controls the DC supply 120. The data loaded by the controller 130 may be obtained from the single-step method for modeling the ADE; DAEs that describe, for example, charging/discharging, heating, cycling, etc., for the rechargeable batteries. For example, data (e.g., parameters)obtained by the Examples 1-5 above may be used to control charging/discharging current, charging/discharging voltage, temperature of the battery, peak efficiency of the battery, optimal number of charging/discharging cycles, etc., of the batteries 160a, 160b through the controller 130 and/or programmable chip 141. In some embodiments, the controller 130 may control the DC supply 120 directly. In some embodiments, the controller 130 may be part of (e.g., may be carried by) the electronics board 140.

Figure 10:
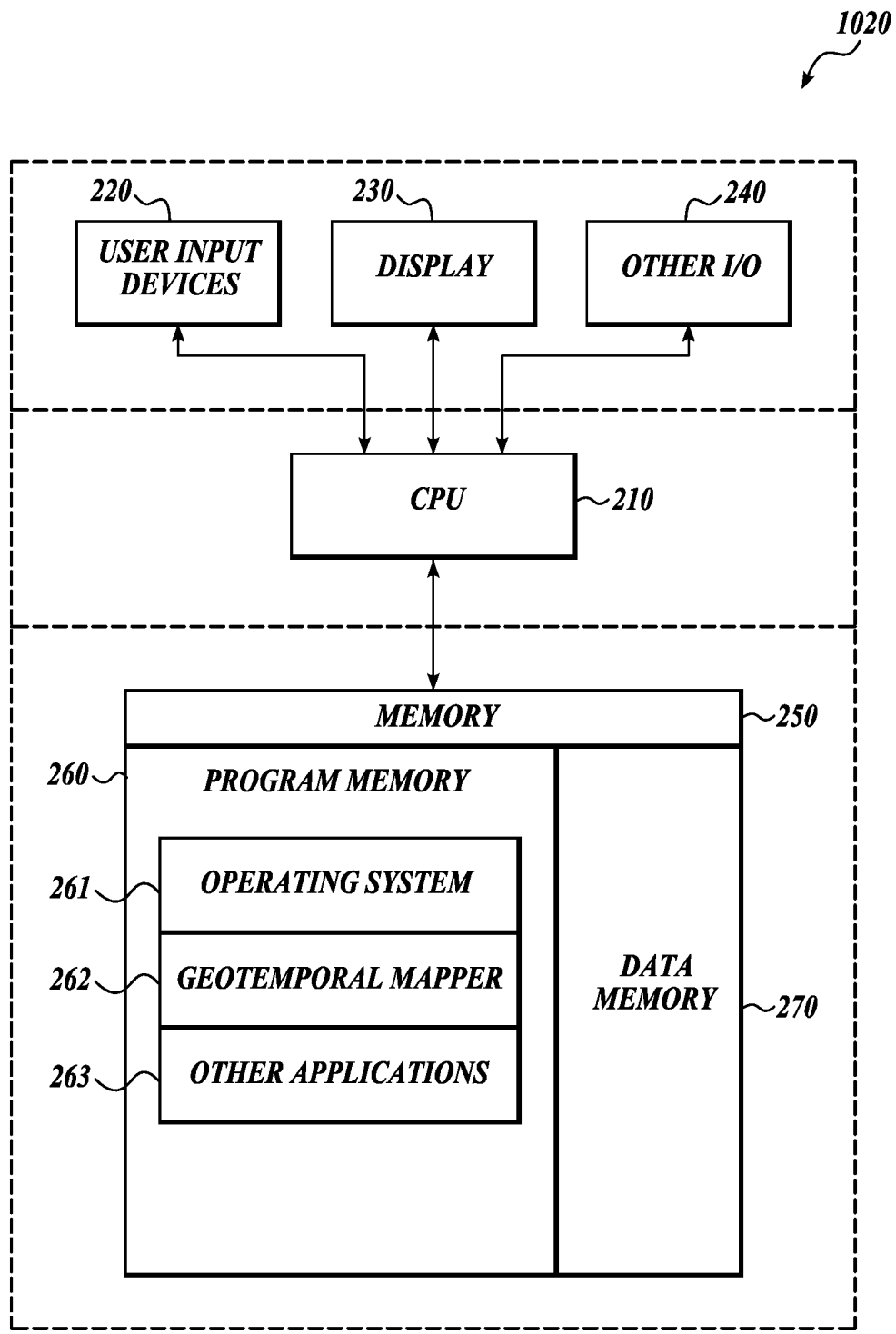
FIG. 10 is a block diagram of a controller for the battery charging system in accordance with an embodiment of the presently disclosed technology.

FIG. 10 is a block diagram of a controller 1020 (e.g., a computing device) for the battery charging system in accordance with an embodiment of the presently disclosed technology. The controller 1020 includes one or more input devices 220 that provide input to a CPU (processor) 210. Input devices 220 can include, for example, a mouse, a keyboard, a touchscreen, an infrared sensor, a touchpad, wearable input devices, a camera or image-based input device, microphone, or other input devices. The CPU 210 may be a single processing unit or multiple processing units in a device or distributed across multiple devices. The CPU 210 may be coupled to other hardware devices, for example, with the use of a BUS, such as a PCI BUS or SCSI BUS. Further, the CPU 210 may communicate with a hardware controller for devices such as for a display 230. The display 230, for example, may be used to display text and graphics. One example of a suitable display 230 is a touchscreen that provides graphical and textual visual feedback to a user. In some embodiments, the display 230 includes the input devices 220 as part of the display, such as when the input device is a touchscreen. In some embodiments, the display 230 is separate from the input device 220. Examples of standalone display devices include, for example, an LCD display screen, an LED display screen, a projected display (such as a heads-up display device), and so on. Other I/O devices 240 may also be coupled to the CPU 210, such as a video or audio card, USB or other external devices, printer, speakers, CD-ROM drive, DVD drive, disk drives, Blu-Ray devices, battery connection cables, or battery measurement tools. In some implementations, other I/O devices 240 also include a communication device capable of communicating wirelessly or wire-based with a network node. The communication device may communicate with another device or a server through a network using, for example, TCP/IP protocols.

The CPU 210 can access a memory 250. The memory 250 can include one or more hardware devices for volatile and non-volatile storage, and may include both read-only and writable memory. For example, the memory 250 may comprise random access memory (RAM), read-only memory (ROM), writable non-volatile memory, such as flash memory, hard drives, floppy disks, CDs, DVDs, magnetic storage devices, tape drives, device buffers, and so forth. The memory 250 can include non-transitory electrical signals on the underlying hardware. The memory 250 can include program memory 260 that contains programs and software, such as an operating system 261, geotemporal mapper 262, and other application programs 263. The memory 250 also includes data memory 270 that includes any configuration data, settings, user options and preferences that may be needed by the program memory 260. System 1020 may include general purpose or special purpose computing system environments or configurations.

Many embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

From the foregoing, it will be appreciated that specific embodiments of the technology have been described herein for purposes of illustration, but that various modifications may be made without deviating from the disclosure. For example, in some embodiments, the EPROM chip may be a part of the controller. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The invention claimed is:

1. A method for charging a rechargeable battery comprising:
generating, by a computing device, a model of the rechargeable battery;
determining one or more initial conditions for one or more algebraic variables of the model using a solver based on perturbations;
holding differential variables of the model static by a switch function while determining the one or more initial conditions for one or more algebraic variables;
applying the initial conditions to differential equations of the model by the switch function;
determining one or more parameters for the rechargeable battery by solving algebraic and differential equations of the model with the solver; and
by a programmable chip, adjusting a state of the battery based on the one or more parameters by electrically connecting a DC power supply to the rechargeable battery,
wherein the switch function is a tan h function.

2. The method of claim 1, wherein adjusting the state of the battery includes at least one of adjusting a charging/discharging current, a charging/discharging voltage, a temperature of the battery, a peak efficiency of the battery, or an optimal number of charging/discharging cycles.

3. The method of claim 1, wherein the model comprises a set of differential algebraic equations (DAEs).

4. The method of claim 3, further comprising separating the DAEs into at least one algebraic equation (AE) and at least one differential equation (DE).

5. The method of claim 3, wherein the one or more parameters for the rechargeable battery comprise a solution of the set of the DAEs.

6. The method of claim 1, wherein the initial conditions are determined by perturbations.

7. The method of claim 1, wherein the solver is a Rosenbrock type solver.

8. The method of claim 1, wherein the switch function is defined as:

$$T_H = \tfrac{1}{2}(1 + \tan h(q(t-t_j))),$$

where q is a weighting factor determining the discreteness of the function, and tj is the time allowed for the perturbation to find consistent algebraic initial conditions.

9. A system for charging a rechargeable battery comprising:
a computing device in electrical communication with a programmable chip on an electronics board, the computing device configured to:
generate a model of the rechargeable battery;
determine one or more initial conditions for one or more algebraic variables of the model using a solver based on perturbations;
hold differential variables of the model static by a switch function while the one or more initial conditions are being determined for one or more algebraic variables; and
apply the initial conditions to differential equations of the model by the switch function, and determine one or more parameters for the rechargeable battery by solving the algebraic and differential equations of the model with the solver; and
the programmable chip of the electronics board configured to electrically connect a DC power supply to the rechargeable battery,
wherein the electronics board is configured to adjust charging or discharging of the battery based on the one or more parameters received from the computing device,
wherein the switch function is a tan h function.

10. The system of claim 9, further comprising one or more rechargeable batteries.

11. The system of claim 10 wherein the one or more rechargeable batteries are lithium-ion batteries.

12. The system of claim 9, wherein the programmable chip is an EPROM carried by the electronics board, wherein the EPROM is:
configured to receive the one or more parameters received from the computing device, and
configured to adjust a charging voltage to the rechargeable battery based on the one or more parameters received from the computing device.

13. The system of claim 9, further comprising a housing for rechargeable batteries.

14. The system of claim 9, wherein the computing device is a controller.

15. The system of claim 14, wherein the controller is carried by the electronics board.

16. The system of claim 9, wherein the model comprises a set of differential algebraic equations (DAEs).

17. The system of claim 16, wherein the one or more parameters for the rechargeable battery comprise a solution of the set of the DAEs.

18. The system of claim 9, wherein the initial conditions are determined by perturbations.

19. The system of claim 9, wherein the switch function is defined as:

$$T_H = \tfrac{1}{2}(1 + \tan h(q(t-t_j))),$$

where q is a weighting factor determining the discreteness of the function, and tj is the time allowed for the perturbation to find consistent algebraic initial conditions.

20. A computer-readable storage device storing computer-executable instructions, the instructions causing charging a rechargeable battery by:
  generating, by a computing device, a model of the rechargeable battery;
  determining one or more initial conditions for one or more algebraic variables of the model using a solver based on perturbations;
  holding differential variables of the model static by a switch function while determining the one or more initial conditions for one or more algebraic variables;
  applying the initial conditions to differential equations of the model by the switch function;
  determining one or more parameters for the rechargeable battery by solving algebraic and differential equations of the model with the solver; and
  adjusting a state of the battery based on the one or more parameters,
  wherein the switch function is a tan h function.

21. The computer-readable storage device of claim 20, further comprising instructions for separating a set of differential algebraic equations (DAEs) into at least one algebraic equation (AE) and at least one differential equation (DE).

22. The computer-readable storage device of claim 20, wherein the one or more parameters of the rechargeable battery comprise a solution of the set of the DAEs.

23. The computer-readable storage device of claim 20, wherein the initial conditions are determined by perturbations.

24. The computer-readable storage device of claim 20, wherein the switch function is defined as:

$$T_H = \tfrac{1}{2}(1 + \tan h(q(t-t_j))),$$

where q is a weighting factor determining the discreteness of the function, and tj is the time allowed for the perturbation to find consistent algebraic initial conditions.

* * * * *